US005799102A

United States Patent [19]

Leong

[11] Patent Number: 5,799,102

[45] Date of Patent: Aug. 25, 1998

[54] BANK NOTE SCANNER UTILIZING OLFACTORY CHARACTERISTICS FOR AUTHENTICATION

[75] Inventor: Liem Hak Leong, Dundee, Scotland

[73] Assignee: NCR Corporation, Dayton, Ohio

[21] Appl. No.: 602,528

[22] Filed: Feb. 20, 1996

[30] Foreign Application Priority Data

Aug. 31, 1995 [GB] United Kingdom .................... 9517796

[51] Int. Cl.[6] .................... G06K 9/00

[52] U.S. Cl. .................... 382/135

[58] Field of Search .................... 382/135, 136, 382/137, 138, 139, 100, 325; 235/379; 73/23.34; 209/534; 340/825.3, 825.31, 825.32, 825.34, 825.35; 283/74

[56] References Cited

U.S. PATENT DOCUMENTS

| | | | |
|---|---|---|---|
| 4,399,687 | 8/1983 | Collins | 73/23.34 |
| 4,480,177 | 10/1984 | Allen | 235/379 |
| 4,837,840 | 6/1989 | Goldman | 382/135 |
| 4,880,851 | 11/1989 | Yamamoto | 427/213.3 X |
| 5,112,040 | 5/1992 | Johnston et al. | 271/11 |
| 5,619,620 | 4/1997 | Eccles | 382/158 |

FOREIGN PATENT DOCUMENTS

| | | |
|---|---|---|
| 0386353 | 9/1990 | European Pat. Off. . |
| 0632268 | 1/1995 | European Pat. Off. . |
| 0660276 | 6/1995 | European Pat. Off. . |
| 3826263 | 2/1990 | Germany . |
| 4437067 | 5/1995 | Germany . |
| 9508113 | 3/1995 | WIPO . |

OTHER PUBLICATIONS

Nakamoto et al. "Odor Sensor Using Quartz-Resonator Array and Neural-Network Pattern Recognition." IEEE 1988 Untrasonics Symposium, Oct. 1988, pp. 613–616.

Corcoran. "Electronic Odour Sensing Systems." Electronics and Communication Engineering Journal, vol. 5, No. 5, pp. 303–308, Oct. 1993.

Saunders et al. "An Artificial Olfactory System Using Tiered Artificial Neural Networks." Proc. 1994 2nd Australian and New Zealand Conf. on Intelligent Info. Systems, pp. 76–80, Dec. 1994.

*Primary Examiner*—Jon Chang

*Attorney, Agent, or Firm*—Michael Chan

[57] ABSTRACT

The invention concerns a bank note scanner (2) for assessing the authenticity of a bank note, which includes a vacuum pump (4), an olfactory sensor (8), an authentication means (28) for producing an electrical output indicative of the authenticity of a bank note, and suction means (10) connected to the vacuum pump (4) via the olfactory sensor (8). In operation, a bank note is fed through an entry slot (50) in the scanner (2) into co-operative relationship with the suction means (10) such that the bank note covers, and is sucked against, the suction means (10), thus enabling the sensor (8) to test the note. The authentication means (28) comprises a neural network (26) which can be taught the olfactory characteristics of an authentic bank note. The authentication means (28) is arranged to make a determination of the authenticity of the bank note based on the comparison of the electrical output of the olfactory sensor (8) and the olfactory characteristics of one or more authentic bank notes.

9 Claims, 4 Drawing Sheets

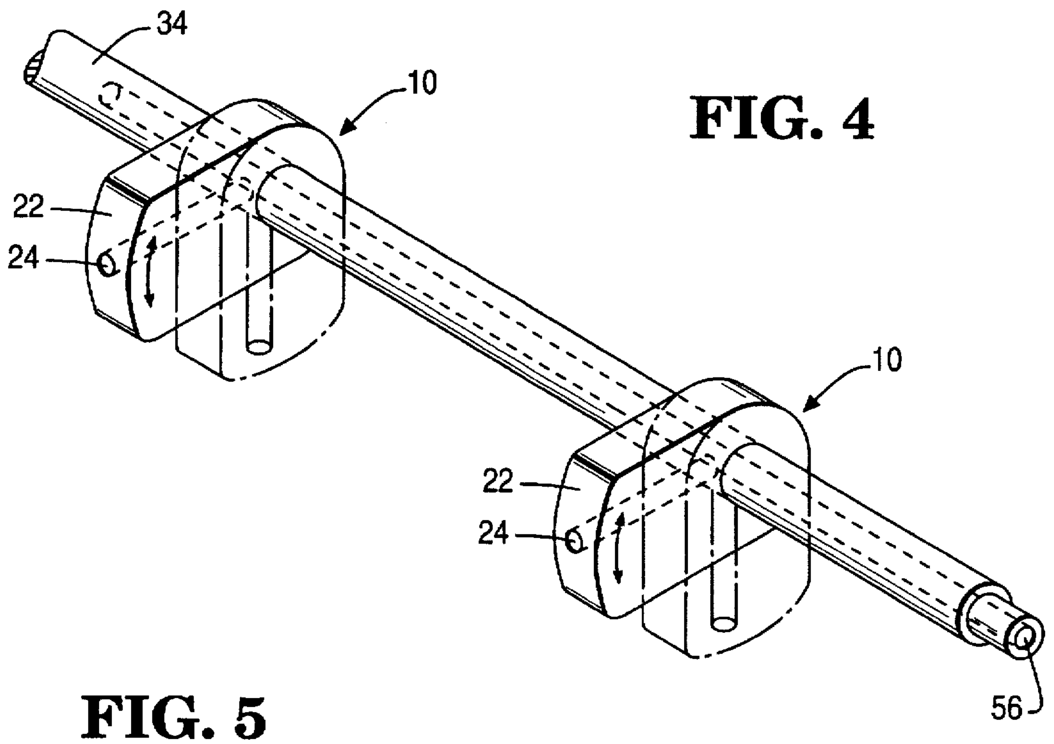
FIG. 4
FIG. 5
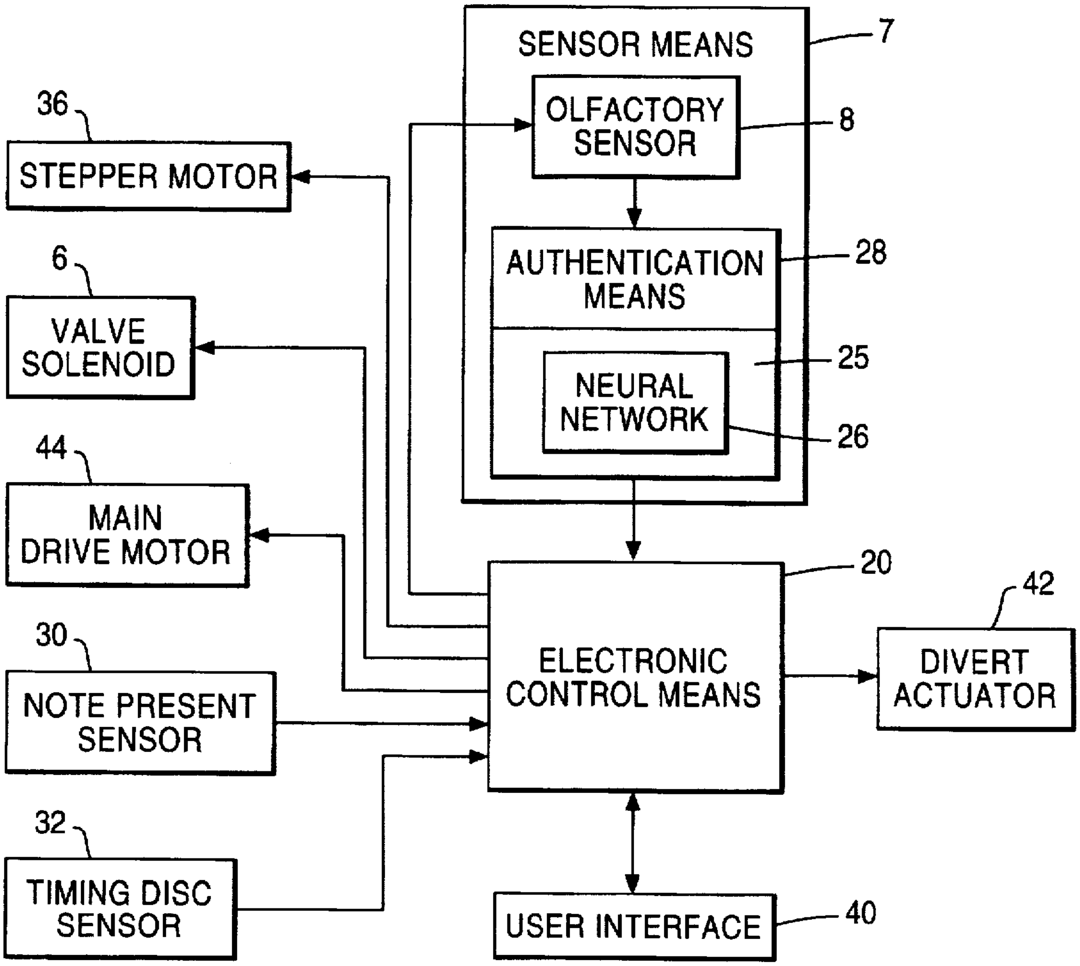

BANK NOTE SCANNER UTILIZING OLFACTORY CHARACTERISTICS FOR AUTHENTICATION

BACKGROUND OF THE INVENTION

The invention relates to a bank note scanner, and in particular to a bank note scanner adapted to determine the authenticity of bank notes.

The invention has application, for example, to a bank note scanner for use in an automated currency loading module used to load currency storage cassettes, in which bank notes are stored in an automated teller machine (ATM) prior to being dispensed to customers, or in the currency screening module of a financial transaction terminal, such as an ATM, adapted to receive bank notes deposited by a user of the ATM.

Known bank note scanners utilize an optical sensor means which produces an image of a note being scanned, for comparison in the scanner with an image of each authentic bank note with which the scanner is intended for use, such as, for example, the notes comprising present British, American or Japanese currency. Detailed images of the appropriate authentic bank notes are stored in a digital form in these scanners, requiring a substantial memory facility. Only if the image of a scanned note corresponds to that of one of the stored images is the scanned note considered to be authentic.

Not only is such a memory facility expensive, but the comparison also requires significant processing power which further increases the cost of known scanners.

SUMMARY OF THE INVENTION

It is an object of the present invention to introduce a new approach to bank note scanning, which will alleviate the problems discussed above.

According to a first aspect of the present invention there is provided a bank note scanner, comprising sensor means incorporating a sensor and an authentication means for providing a signal indicative of the authenticity of each scanned bank note, dependent on the output of an olfactory sensor.

According to a second aspect of the present invention there is provided a method of determining the authenticity of a bank note, characterized by collecting an air sample which includes a sample of the substance utilized to print said bank note, transmitting said air sample to an olfactory sensor and making a determination, dependent on the output of said olfactory sensor, as to the authenticity of said bank note.

Olfactory sensors can recognize and identify products such as food stuffs, chemicals, inks or pigments by the odours they produce, in levels as low as a few parts per million.

Olfactory sensors, such as those manufactured by AromaScan of 14 Clinton Drive, Hollis ,N.H. 03049 U.S.A., comprise a plurality of semiconductor polymer sensor elements, each of which suffers a change in resistance due to the exposure of the element to a range of compounds. The effect the compounds in an odour or aroma have on the resistance of each sensor element can be quantified and the outputs of all of the individual sensor elements can be combined to produce a so-called odour map which is unique to, and characteristic of, a specific compound, as will be discussed below.

Storing an odour map of the security pigment utilized to print an authentic bank note requires considerably less memory than is required to store a visual image of the note.

The invention has particular advantage in countries, such as the U.S.A., in which all bank notes are printed with a single security pigment, as only a single odour map need be stored.

BRIEF DESCRIPTION OF THE DRAWINGS

An embodiment of the present invention will now be described, by way of example, with reference to the accompanying drawings in which:

FIG. 4 is an enlarged perspective view of suction means of the scanner; and

FIG. 5 is a block circuit diagram of the scanner.

FIGS. 1 to 5 illustrate a bank note scanner 2 for assessing the authenticity of a bank note. The scanner 2 incorporates: a vacuum pump 4; a solenoid operated valve 6; a sensor means 7 incorporating an olfactory sensor 8 and an authentication means 28 for producing an electrical output indicative of the authenticity of a bank note being tested; and pivotably mounted suction means 10. The elements 4, 6 and 8 are connected together via a vacuum line 12 which is connected to the suction means 10 via an internal bore 56 in a pivotable shaft 34 on which the suction means 10 are mounted. In operation, reduced pressure can be applied by the pump 4 to the suction means 10 via the olfactory sensor 8 by energization of the solenoid of the valve 6, as illustrated in FIG. 4.

Figure 1:
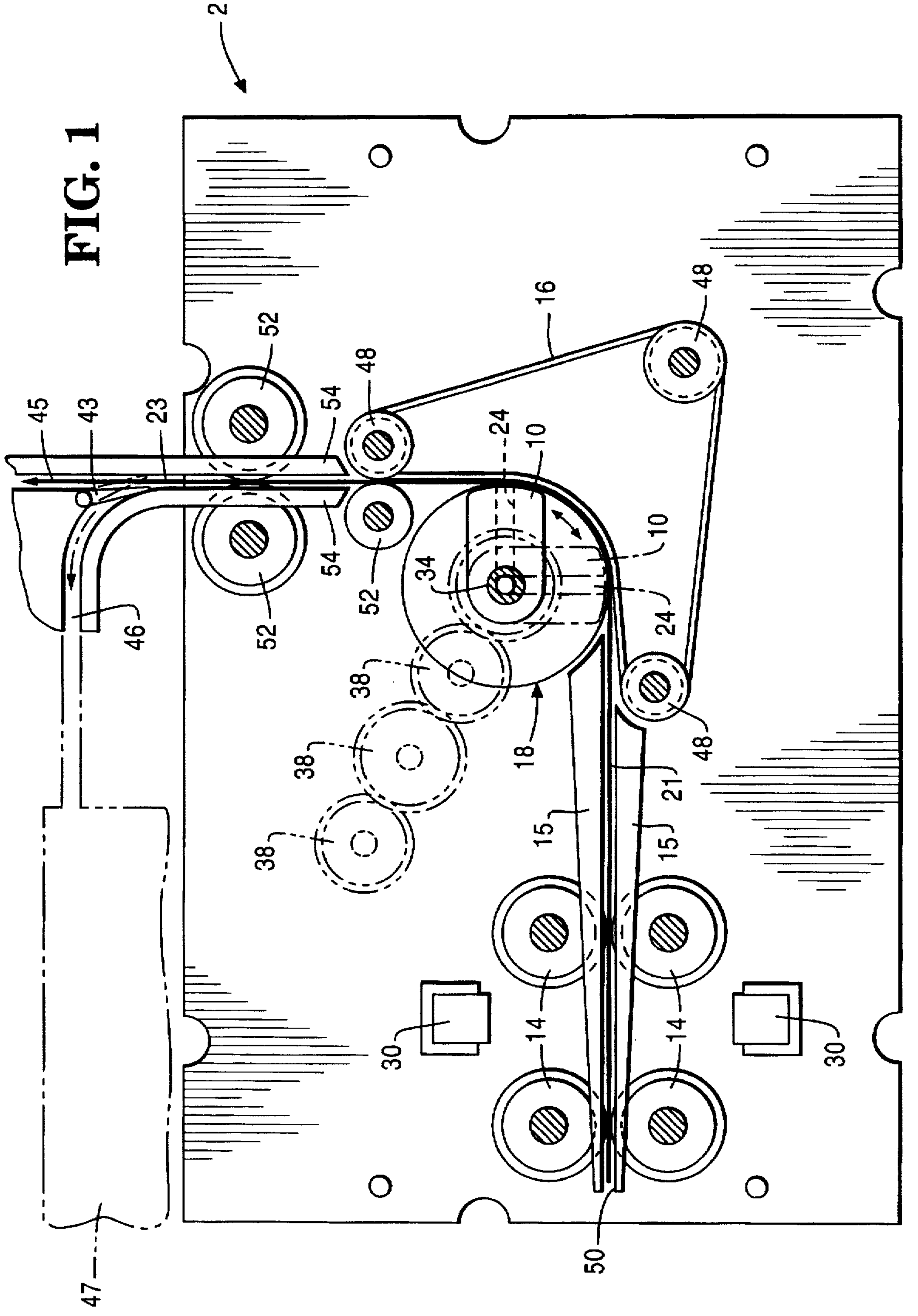
FIG. 1 is a side view of a bank note scanner in accordance with the present invention.
Figure 2:
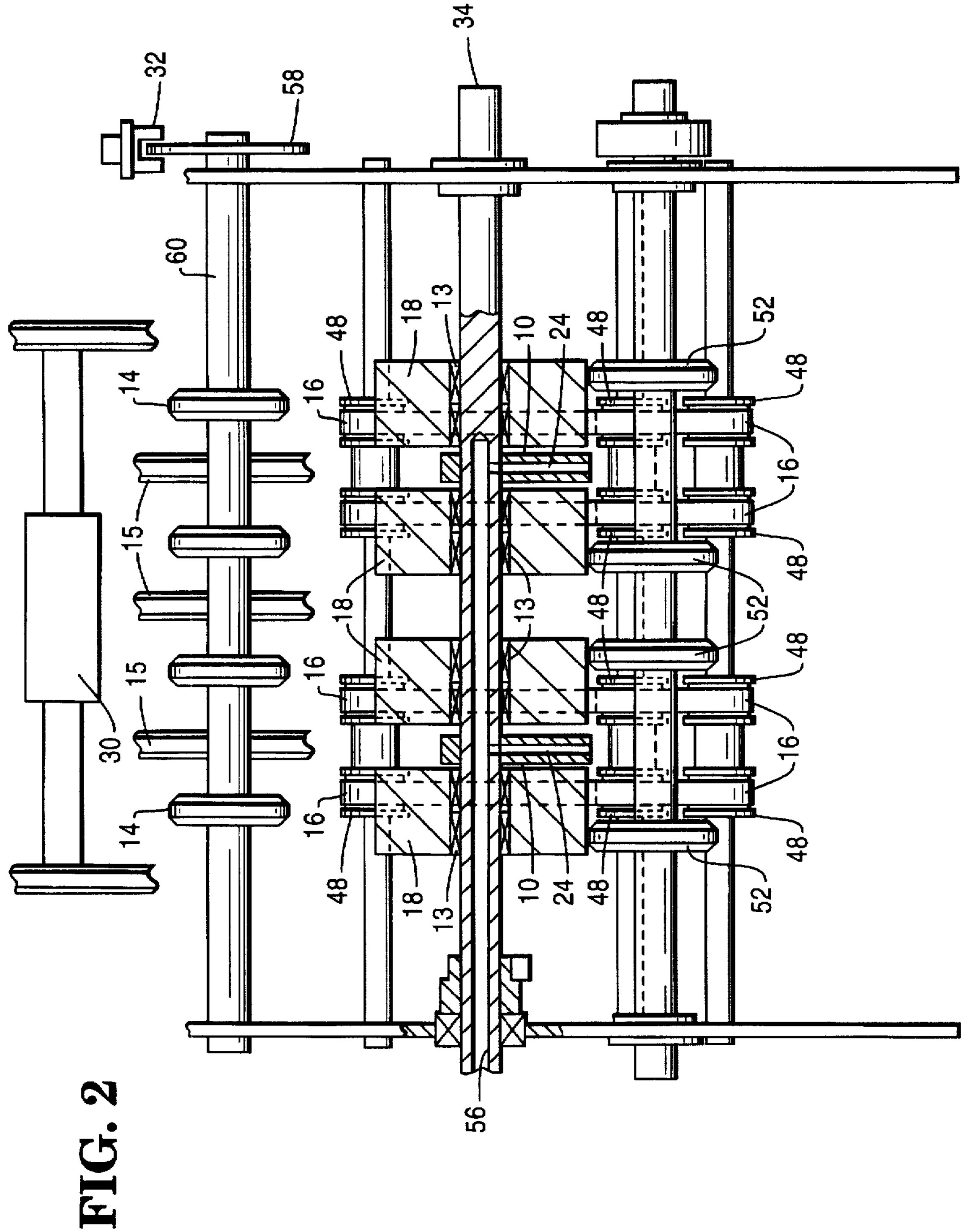
FIG. 2 is a plan view, shown partly in section, of part of the scanner of FIG. 1.

Referring now particularly to FIGS. 1 and 2, first feed means 14,16 in the form of rollers 14 and endless belts 16 are arranged along with guide means 15, 18 so as to bring a bank note into co-operative relationship with the suction means 10, when in use. Each endless belt 16 passes around associated pulleys 48, as best seen in FIG. 1. The outer surfaces of the belts 16 respectively extend partly around the circumferences of associated cylindrical members which form the guide means 18. The first feed means 14,16 and guide means 15,18 are arranged to feed a bank note from an entry slot 50 along an inward feed path 21 into co-operative engagement with the suction means 10. A note present detector 30 is positioned near the entry slot 50 for detecting the leading edge of a bank note fed along the feed path 21.

When the authenticity of the bank note is being assessed, the bank note covers, and is sucked against, the suction means 10. Authentication means 28 (FIG. 5) coupled to the olfactory sensor 8 provides an indication of the authenticity of the bank note based on the electrical output of the olfactory sensor 8, as will be described in more detail below.

An outward feed path 23 from the suction means 10 divides into alternative exit paths 45,46 for authentic and forged bank notes respectively. Notes are driven along the outward feed path 23 by the belts 16 and additional feed rollers 52 associated with further guide means 54, as illustrated in FIG. 1. For the sake of clarity the guide means 54 and some of the rollers 52 are not shown in FIG. 2. A note divert gate 43 is positioned at the junction of the exit paths 45,46. The gate 43 is operated by the electronic control means 20 via a divert actuator 42 so as to divert forged bank notes into the exit path 46 for storage in a receptacle 47. Authentic bank notes are fed along the other exit path 45 for storage in a currency cassette (not shown) for later use in an ATM.

The suction means 10 is formed by two substantially rectangular blocks an end surface 22 of each of which abuts a bank note during the assessment process (FIG. 4). Each of the blocks forming the suction means 10 has an internal bore 24 running from the surface 22 to a shaft 34 on which the suction means 10 is mounted. The internal bore 24 of each block is connected to the vacuum means 4,6 via the internal bore 56 in the shaft 34 which is connected to the vacuum line 12. It should be understood that the shaft 34 is connected to the vacuum line 12 in such a manner as to permit pivotal movement of the shaft 34 relative to the line 12.

Each surface 22 has a resilient coating of plastics material which aids the production of a vacuum seal between the suction means 10 and a bank note. The end surfaces 22 are curved and have the same radius of curvature as the guide means 18, which aids the vacuum seal between the suction means 10 and the note during rotation of the suction means 10, as will be discussed further below. As an alternative to a suction means 10 comprising a pair of blocks a suction means may be utilized which comprises a single block.

The assessment of a bank note is achieved by the vacuum pump 4 drawing air through the vacuum system from the suction means 10, thus drawing the bank note tightly into contact with the surfaces 22 of the suction means 10 and drawing odours from the security pigment or pigments in authentic bank notes or the ink or inks in forged bank notes into the internal bore 24 in each of the suction means 10, along the bore 56 in the shaft 34 and into the olfactory sensor 8.

The feed means 14,16 and guide means 15,18 are further arranged such that a bank note is presented to the suction means 10 in a plane substantially orthogonal to the bores 24 of the suction means 10, whereby the best possible seal is provided between the bank note and the suction means 10.

Shortly after a bank note enters the entry slot 50 of the scanner 2, the leading edge of the note is detected by the input note present sensor 30. When it is in its starting position, the suction means 10 is positioned as shown in chain outline in FIG. 1, with the bores 24 extending vertically. After the bank note has been fed by the feed rollers 14 to a position in which the note covers the outer ends of the bores 24, the solenoid operated valve 6 is activated so that the vacuum system causes the bank note to be sucked into contact with the suction means 10.

In order to improve the speed of operation of the testing process, the shaft 34 is mounted in bearing means 13 (FIG. 2) so that the suction means 10 is pivotably movable with respect to the feed means 14,16,52 and the guide means 15,18,54 during the testing process. The suction means 10 is mounted for pivotal movement through approximately 90° between its starting position shown in chain outline in FIG. 1, in which position a bank note is sucked against the suction means 10, and a second position shown in solid outline in FIG. 1, in which position the valve 6 is deactivated so as to enable the bank note to be fed from the suction means 10 by the belts 16 and the feed rollers 52 along the outward feed path 23 and into the first or the second exit path 45 or 46, depending on whether or not the note is authentic. It should be understood that, while the bank note is held by suction in contact with the suction means 10, the note is carried between the suction means 10 and the endless belts 16 from the inward feed path 21 to the outward feed path 23 without any interruption in the feeding movement of the note, which results in very rapid throughput of notes through the scanner 2.

Also, the olfactory sensor 8 used is a high speed olfactory sensor, such as those produced by AromaScan as mentioned above, which is capable of providing data to the authentication means 28, such that the authentication means 28 can produce an odour map of a tested air sample in less than 100 milliseconds.

Furthermore, a vacuum pump 4 is utilized which is capable of pumping all of the air contained in the internal bores 24 through the internal bore 56 to the olfactory sensor 8 in less than 100 milliseconds to ensure that no contamination of a sample occurs due to the presence of air from the previous sample.

Consequently, bank notes can be tested at the rate of at least ten notes per second with this scanner 2.

Figure 3:
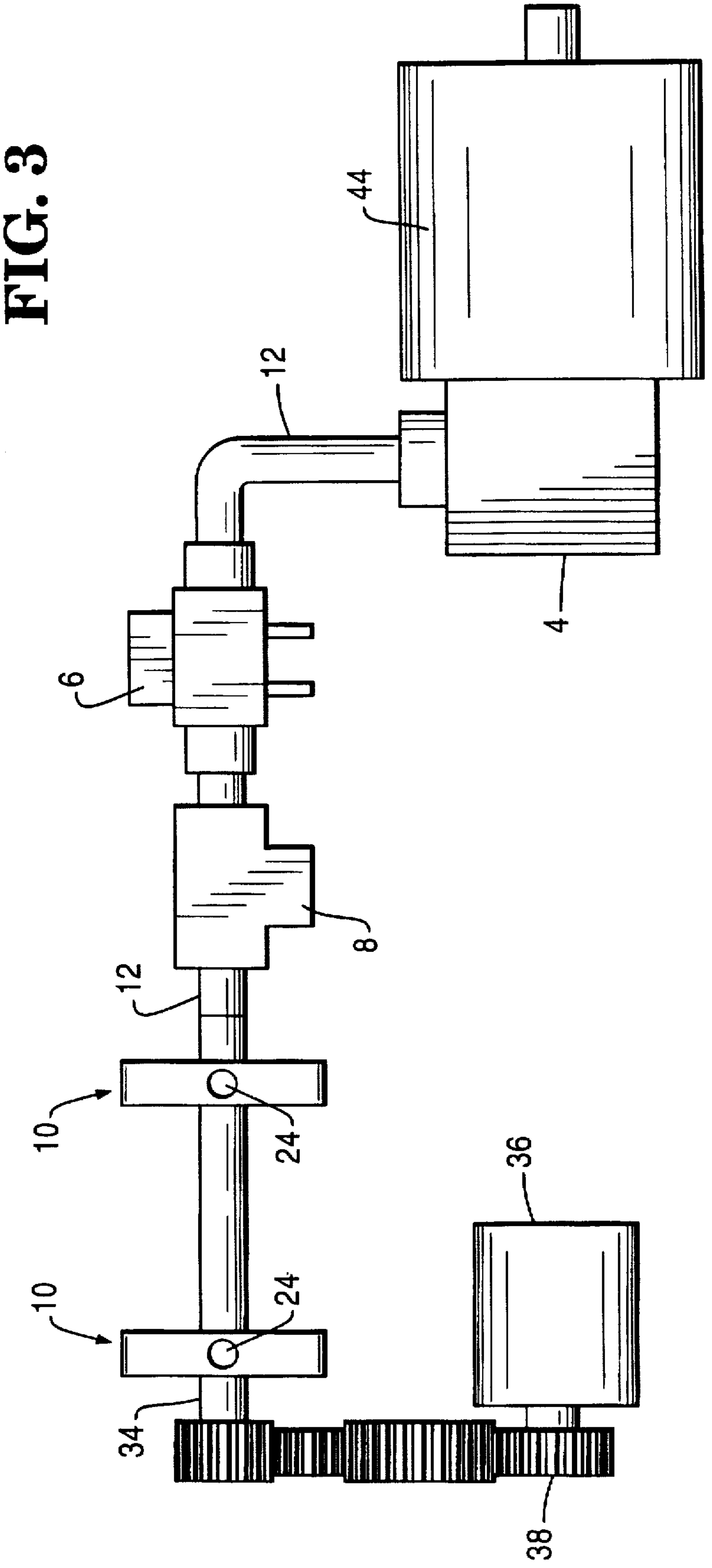
FIG. 3 is a schematic diagram of a vacuum system of the scanner which enables olfactory detection.

The shaft 34 on which the suction means 10 is mounted is driven by a stepper motor 36 through gears 38 (see FIG. 3), pivotal movement of the suction means 10 being commenced simultaneously with the activation of the valve 6. The feed means 14,16,52 are driven by a main drive motor 44 (FIG. 5) under the control of the electronic control means 20. The drive mechanisms are so arranged that the peripheral speed of the suction means 10 when rotating from its starting position to said second position is substantially equal to the speed of the endless belts 16 driven by the pulleys 48.

Regarding the process of olfactory testing, commercially available olfactory sensors, such as those manufactured by AromaScan and mentioned above, are used, although other high speed olfactory sensors could be substituted. Such sensors comprise an array of semiconductor polymer sensor elements. Individual chemical compounds interact with the polymer coated surface of each sensor element and affect the resistance of each individual element, as discussed above. A standard array of sensor elements can be utilized to detect a broad range of chemical species or, if necessary, custom arrays, adapted to react to a specific type of compound, can be selected from an extensive range of polymeric materials provided, for example, by AromaScan. The data from the olfactory sensor 8 is processed in the authentication means 28 to provide a unique pattern of response from the array of sensor elements, known as an odour map, as discussed above. The processing in the authentication means 28 is carried out using a comparator means 25 comprising a neural network 26 (FIG. 5), also available from AromaScan, capable of performing real time pattern recognition, in order both to determine the odour map for a given bank note being tested and to compare this odour map with that of authentic bank notes stored in the scanner 2.

The neural network 26 is taught the olfactory characteristics of the pigments used to print each of the authentic bank notes with which the scanner 2 is intended for use, by scanning a plurality of each different authentic bank note. The neural network 26, which is capable of learning the olfactory characteristics of each authentic bank note, is therefore provided with a specimen of each of the appropriate authentic bank notes which it utilizes as a standard against which all the notes tested by the scanner 2 are compared.

The use of such a comparison is particularly advantageous when testing for the presence of the security pigments utilized in printing bank notes as the exact specifications of these pigments are maintained a closely guarded secret by the appropriate government authorities, in order to prevent their use in the production of forgeries.

The operation of the scanner 2 will now be described. Firstly, the neural network 26 in the authentication means 28 is taught the olfactory characteristics of the security pigment or pigments used to print the appropriate authentic bank notes, as discussed above. The scanner 2 can then be used to test for authentic bank notes by inserting bank notes to be tested through the input slot 50 in the scanner 2. The input sensor 30 then detects the leading edge of a bank note to be assessed, a signal is sent by the sensor 30 to the control means 20 causing the control means 20 to commence counting pulses from the timing disc sensor 32. After a predetermined number of pulses have been counted, the control means 20 activates the solenoid valve 6 thus actively connecting the suction means 10 to the vacuum pump 4 resulting in the bank note being drawn into contact with, and sucked against, the top surfaces 22 of the suction means 10.

The control means 20 then activates the olfactory sensor 8 to produce data which is transmitted to the authentication means 28, which in turn compares the data produced by the sensor 8 with the olfactory characteristics of the appropriate authentic bank notes, in the form of odour maps of these bank notes, and produces a signal indicative of the authenticity of the bank note being tested. As this assessment of the scanned bank note is being carried out the suction means 10 is rotated through approximately 90° as previously described. Thus, the bank note continues to be conveyed through the scanner 2 as the assessment is carried out. The bank note is guided during rotation of the suction means 10 by the guide means 18 and the endless belts 16, with the note being held between the suction means 10 and the belts 16.

When the suction means 10 reaches said second position shown in solid outline, the solenoid of the valve 6 is deactivated so that the vacuum connection between the suction means 10 and the pump 4 is terminated. The bank note is then conveyed by the feed rollers 52 and the endless belts 16 from the suction means 10 along the outward feed path 23.

If the note is authentic then a first signal is sent from the authentication means 28 to the control means 20 and the control means 20 does not cause the divert actuator 42 to actuate the gate 43 and the authentic bank note is fed along the exit path 45 for storage in a currency cassette (not shown). If a determination is made that the note is not authentic, then the authentication means 28 sends a second signal to the control means 20 which in turn causes the divert actuator 42 to be operated so as to cause the gate 43 to divert the forged note into the exit path 46 for storage in the receptacle 47. While the note is being fed from the suction means 10 to the exit path 45 or 46, the suction means 10 is rotated back to its starting position in time to be brought into co-operative relationship with the next bank note to be assessed.

In this preferred embodiment the suction means 10 is arranged to rotate together with the endless belts 16 during the testing of a bank note. In this way the authenticity of the bank note may be assessed while the bank note is moving through the scanner 2, thus increasing the number of notes which can be assessed by the scanner 2 in a given time. However, if high speed testing is not required the suction means 10 may be mounted in a fixed position. Also, a simplified version of the scanner can be implemented without the transport means 14,16,52 for transporting bank notes to and from the suction means 10, in which the note to be tested is held against the suction means manually. Such an embodiment could be used, for example, to test the authenticity of bank notes used to purchase merchandise in a store.

I claim:

1. A bank note scanner for determining the authenticity of a bank note being tested, the bank note scanner comprising:

sensor means for sensing an olfactory characteristic of a substance associated with the bank note being tested; and authentication means for comparing the olfactory characteristic of the substance associated with the bank note being tested and an olfactory characteristic of a security pigment which has been used to print an authentic bank note during production of the authentic bank note to determine the authenticity of the bank note being tested.

2. A bank note scanner according to claim 1, wherein the sensor means includes an olfactory sensor.

3. A bank note scanner according to claim 2, wherein the olfactory sensor is coupled between a vacuum pump and an air feed which is brought into contact with the bank note being tested such that air drawn through the air feed by the vacuum pump passes through the olfactory sensor.

4. A bank note scanner according to claim 1, wherein the authentication means comprises a neural network which is adapted to learn at least one olfactory characteristic of at least one security pigment which has been used to print an authentic bank note during production of the authentic bank note.

5. A bank note scanner for determining the authenticity of a bank note being tested, the bank note scanner comprising:

an olfactory sensor for sensing an olfactory characteristic of a substance associated with the bank note being tested; and a processing unit for comparing the olfactory characteristic of the substance associated with the bank note being tested and an olfactory characteristic of a security pigment which has been used to print an authentic bank note during production of the authentic bank note to determine the authenticity of the bank note being tested.

6. A bank note scanner according to claim 5, wherein the olfactory sensor is coupled between a vacuum pump and an air feed which is brought into contact with the bank note being tested such that air drawn through the air feed by the vacuum pump passes through the olfactory sensor.

7. A bank note scanner according to claim 5, wherein the processing unit comprises a neural network which is adapted to learn at least one olfactory characteristic of at least one security pigment which has been used to print an authentic bank note during production of the authentic bank note.

8. A method of determining the authenticity of a bank note being tested as the bank note is being fed through a scanner, the method comprising the steps of:

(a) collecting an air sample which includes a sample of a substance associated with the bank note being tested;

(b) comparing an olfactory characteristic of the substance associated with the bank note being tested and an olfactory characteristic of a security pigment which has been used to print an authentic bank note during production of the authentic bank note; and (c) determining the authenticity of the bank note being tested based upon the result of the comparison of step (b).

9. A method according to claim 8, further comprising the step of:

(d) feeding an authentic bank note through the scanner to teach a neural network at least one olfactory characteristic of at least one security pigment which has been used to print an authentic bank note during production of the authentic bank note.

* * * * *